United States Patent
Keren et al.

(10) Patent No.: US 12,255,948 B2
(45) Date of Patent: *Mar. 18, 2025

(54) SYSTEM AND METHOD FOR ANALYZING NETWORK OBJECTS IN A CLOUD ENVIRONMENT

(71) Applicant: Wiz, Inc., New York, NY (US)

(72) Inventors: Shai Keren, Oporto (PT); Daniel Hershko Shemesh, Givat-Shmuel (IL); Roy Reznik, Tel Aviv (IL); Ami Luttwak, Binyamina (IL); Avihai Berkovitz, Tel Aviv (IL)

(73) Assignee: Wiz, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/888,981

(22) Filed: Sep. 18, 2024

(65) Prior Publication Data

US 2025/0016222 A1    Jan. 9, 2025

Related U.S. Application Data

(63) Continuation of application No. 18/887,753, filed on Sep. 17, 2024, which is a continuation of application No. 18/479,573, filed on Oct. 2, 2023, which is a continuation of application No. 18/478,534, filed on Sep. 29, 2023, now Pat. No. 11,985,185, which is a continuation of application No. 18/341,134, filed on Jun. 26, 2023, which is a continuation of application No. 17/819,442, filed on Aug. 12, 2022, now Pat. No. 11,722,554, which is a continuation of application No. 17/109,883, filed on Dec. 2, 2020, now Pat. No. 11,431,786.

(51) Int. Cl.
| | |
|---|---|
| G06F 15/173 | (2006.01) |
| H04L 9/40 | (2022.01) |
| H04L 41/046 | (2022.01) |
| H04L 41/50 | (2022.01) |
| H04L 49/00 | (2022.01) |
| H04L 67/10 | (2022.01) |

(52) U.S. Cl.
CPC ............ *H04L 67/10* (2013.01); *H04L 41/046* (2013.01); *H04L 41/5096* (2013.01); *H04L 49/70* (2013.01); *H04L 63/1433* (2013.01)

(58) Field of Classification Search
CPC ... H04L 67/10; H04L 41/046; H04L 41/5096; H04L 49/70; H04L 63/1433
USPC ....... 709/201, 204, 205, 217, 218, 219, 223, 709/224
See application file for complete search history.

(56) References Cited

U.S. PATENT DOCUMENTS 7,392,539 B2 *  6/2008  Brooks ............... H04L 63/0263
                                                        709/224
9,210,185 B1   12/2015  Pinney Wood et al.
(Continued)

*Primary Examiner* — Liang Che A Wang
(74) *Attorney, Agent, or Firm* — M&B IP Analysts, LLC

(57) ABSTRACT

A method and system for providing textual insights on objects deployed in a cloud environment are provided. The method includes collecting object data on objects deployed in the cloud environment, wherein objects are deployed and operable at different layers of the cloud environment; identifying objects deployed in the cloud environment; constructing a visual representation of the cloud environment, including the identified objects and their relationships; and generating textual insights on the identified objects and their relationships using natural language processing.

19 Claims, 6 Drawing Sheets

(56) References Cited

U.S. PATENT DOCUMENTS

| | | | |
|---|---|---|---|
| 10,171,300 B2* | 1/2019 | Eggen | H04L 41/0896 |
| 10,924,347 B1* | 2/2021 | Narsian | H04L 47/12 |
| 10,977,587 B2 | 4/2021 | Khalili | |
| 11,709,944 B2 | 7/2023 | Salji | |
| 2004/0019803 A1 | 1/2004 | Jahn | |
| 2014/0157417 A1* | 6/2014 | Grubel | H04L 63/20 |
| | | | 726/25 |
| 2016/0044057 A1 | 2/2016 | Chenette et al. | |
| 2016/0048556 A1* | 2/2016 | Kelly | G06Q 10/10 |
| | | | 707/767 |
| 2016/0359872 A1* | 12/2016 | Yadav | H04L 63/1408 |
| 2016/0373944 A1* | 12/2016 | Jain | H04M 3/2236 |
| 2017/0075981 A1* | 3/2017 | Carlsson | H04L 41/0826 |
| 2018/0024981 A1* | 1/2018 | Xia | G06F 40/18 |
| | | | 715/215 |
| 2019/0095530 A1* | 3/2019 | Booker | G06F 16/9024 |
| 2020/0252461 A1 | 8/2020 | Xu et al. | |
| 2020/0267175 A1 | 8/2020 | Atighetchi et al. | |
| 2020/0322227 A1* | 10/2020 | Janakiraman | H04L 41/147 |
| 2020/0374343 A1* | 11/2020 | Novotny | G06F 16/9024 |
| 2020/0382539 A1* | 12/2020 | Janakiraman | H04W 12/02 |
| 2023/0008765 A1 | 1/2023 | Kazato | |

* cited by examiner

SYSTEM AND METHOD FOR ANALYZING NETWORK OBJECTS IN A CLOUD ENVIRONMENT

CROSS-REFERENCE TO RELATED APPLICATIONS

This application is a continuation of U.S. patent application Ser. No. 18/887,753, filed Sep. 17, 2024, which is a continuation of U.S. patent application Ser. No. 18/479,573, filed Oct. 2, 2023, which is a continuation of U.S. patent application Ser. No. 18/478,534 filed on Sep. 29, 2023. The Ser. No. 18/478,534 is a continuation of U.S. patent application Ser. No. 18/341,134 filed on Jun. 26, 2023. The Ser. No. 18/341,134 is a Continuation of U.S. patent application Ser. No. 17/819,442 filed Aug. 12, 2022, now U.S. Pat. No. 11,722,554. The Ser. No. 17/819,442 is a continuation of U.S. patent application Ser. No. 17/109,883 filed Dec. 2, 2020, now U.S. Pat. No. 11,431,786, the contents of which are hereby incorporated by reference.

TECHNICAL FIELD

The present disclosure relates generally to network administration, in particular, to systems and methods for analyzing networks.

BACKGROUND

As businesses, governments, and other organizations expand and increase their digital presence through various computer, network, and web technologies, the same parties may be increasingly vulnerable to developing cyber-threats. While updated solutions provide for management of prior cyber-threats, the same systems may include new vulnerabilities, which attackers may seek to identify and exploit to gain access to sensitive systems and data. Specifically, as organizations transition into multi-level computing systems, implementing computing solutions at the individual, group, team, and cloud levels, these systems, and the links between the elements of the layers, as well as the links between elements of different layers, include vulnerabilities which prior solutions fail to address.

Due to the distributed nature of large, multi-layered network systems, management of network access and use may be difficult or impossible for lone administrators or teams of administrators. Management of such code-to-cloud systems, and protection of the same, may require monitoring of large numbers of devices, systems, and components. Further, as each device, system, or component of a network system may be variously connected with the other elements of the system, including connections with multiple other devices via multiple protocols, management and monitoring of individual devices and connections may be untenable.

To address the need to manage large, distributed network systems, operators and administrators may employ various solutions to provide for network analysis. Certain network analysis solutions include manual review of devices, connections, and networks, providing for thorough, specific analysis of individual elements of a network. However, such manual solutions may require prohibitive outlays of time and effort to successfully review every component and connection of a large, multi-layer network, thus failing to provide a solution for analysis of modern network systems. In addition, various analysis solutions include solutions directed to the monitoring of specific device types, such as, for example, firewall control systems, which may provide for management of all firewalls installed in a given network. Similarly, protocol-specific analysis solutions may provide for monitoring of all traffic occurring over given protocols, within the network. However, such specialized solutions may fail to provide for streamlined monitoring and management of all components and connections of a network, where the network includes multiple types of devices communicating via multiple protocols. Further, protocol-agnostic solutions may provide for overall traffic management, providing monitoring and management solutions for all traffic arising within a network. However, such protocol-agnostic solutions may be over-broad, providing irrelevant or redundant information, and may require specification of connections to monitor, reducing efficacy in network-management contexts, while failing to provide device-specific insights, thereby failing to provide for integrated device and connection analysis within a complex, multi-layer network.

In addition, certain solutions providing for the management of large, distributed network systems may fail to provide for agentless management, non-logging solutions, and the like. Agentless management, whereby such large, distributed network systems are managed without the use of a dedicated management agent system or device, may provide for reduced maintenance requirements, as a management agent may require operation and maintenance in addition to the efforts required by the remainder of the network. In addition to failing to provide for agentless management, various solutions for the management of large, distributed network systems fail to provide for non-logging management of the same. Non-logging management, where network analyses and other management processes are executed without reference to netflow logs, provides for reductions in management computing requirements and resource dependency when compared with logging solutions, which may require, without limitation, the execution of additional processing steps or tasks to analyze or process netflow logs, the dependency of the management solution or process on various netflow log resources or repositories, and the like. In addition to the shortcomings described above, current solutions for management of large, distributed network systems may fail to provide for agentless, non-logging management.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the terms "some embodiments" or "certain embodiments" may be used herein to refer to a single embodiment or multiple embodiments of the disclosure.

In one general embodiment, a method may include collecting object data on objects deployed in the cloud environment, where objects are deployed and operable at different layers of the cloud environment; identifying objects deployed in the cloud environment; constructing a visual representation of the cloud environment, including the identified objects and their relationships; generating textual insights on the identified objects and their relationships using natural language processing.

In one general embodiments, a system may include one or more processors configured to: collect object data on objects deployed in the cloud environment, where objects are deployed and operable at different layers of the cloud environment; identify objects deployed in the cloud environment; construct a visual representation of the cloud environment, including the identified objects and their relationships; generate textual insights on the identified objects and their relationships using natural language processing.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1A:
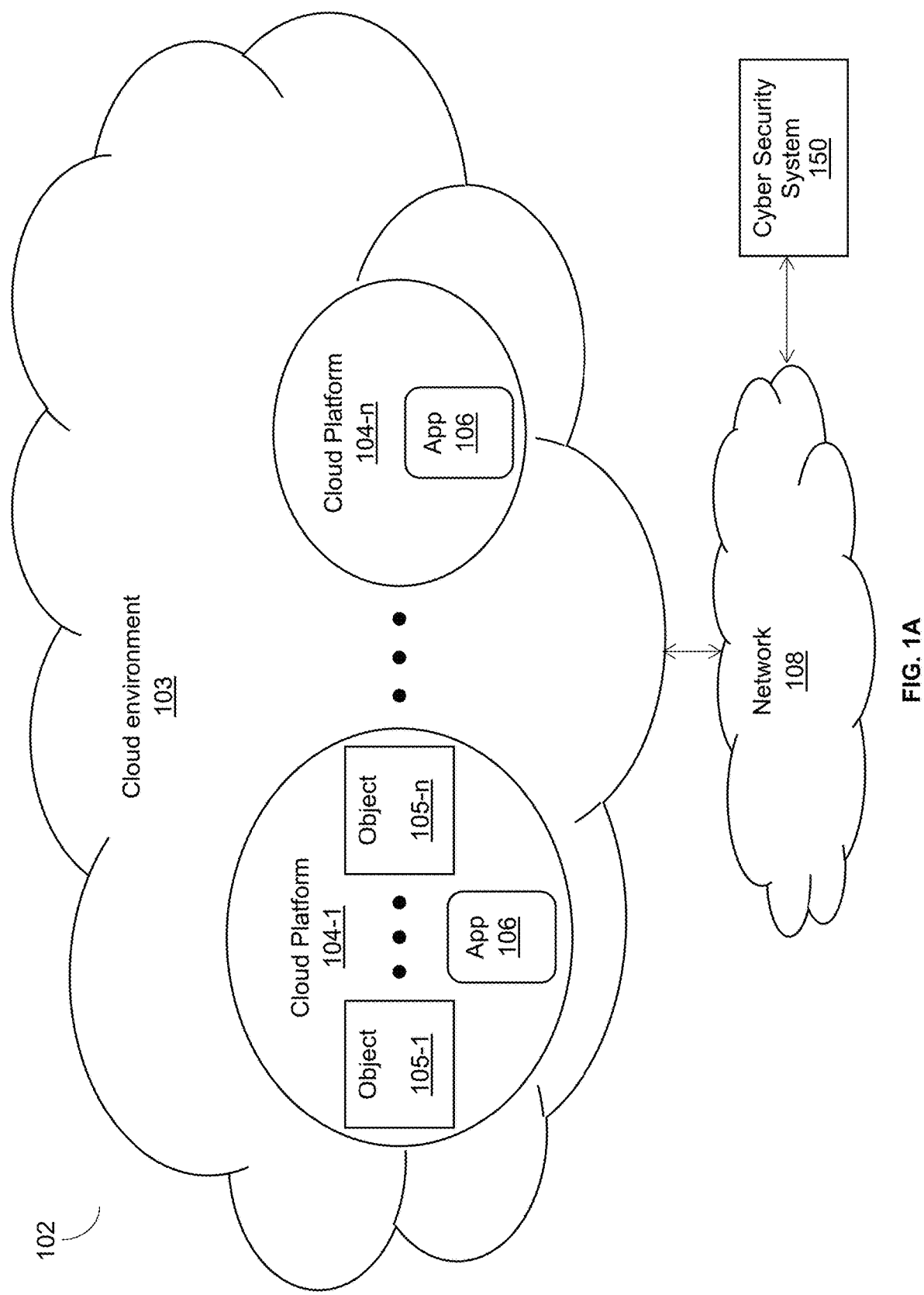
FIG. 1A is a diagram of a cloud environment utilized to describe the various embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The systems and methods described herein may be applicable to various systems, devices, networks, environments, layers, and the like, as well as cross-connections or multi-entity connections as may be established therebetween. The disclosed systems and methods may be applicable to provide support for various network features including, without limitation, application-layer communications, cloud-native constructs, cross-cloud and Kubernetes-to-cloud communications, third-party features, such as third-party containers and objects, container-management systems, such as Kubernetes, as may be virtualized as cloud objects, and the like, as well as any combination thereof.

FIG. 1A is an example diagram [100] 102 of a cloud environment 103 utilized to describe the various embodiments. A cloud environment 103 represents an organization's cloud-based resources, and the various connections between such resources. The cloud environment 103 may include a number of cloud computing platforms, 104-1 through 104-n (hereinafter, "cloud platforms" 104 or "cloud platform" 104), where a cloud platform may include multiple network objects, 105-1 through 105-n (hereinafter, "network objects" 105 or "network object" 105), one or more applications (collectively referred to as applications or apps 106), and the like, as well as any combination thereof. Further, the cloud environment may be configured to connect, via a network 108, with a cyber-security system 150 for one or more purposes including, without limitation, those described hereinbelow. As is applicable to the cloud platforms 104 and network objects 105, "n" is an integer having a value greater than or equal to two. Further, it may be understood that, while a single configuration of a cloud environment 103 is shown for purposes of simplicity, a cloud environment 103 may include various combinations of platforms 104, objects 105, applications 106, and the like, as well as any combination thereof, without loss of generality or departure from the scope of the disclosure.

A cloud platform 104 is a platform, architecture, or other, like, configuration providing for connectivity of the various objects [106] 105, applications 106, and other, like, elements included in a cloud platform 104, as well as the execution of various processes, instructions, and the like. A cloud platform 104 may be a commercially-available cloud system, provided on a service basis, such as, as examples and without limitation, Amazon AWS®, Microsoft Azure®, and the like. A cloud platform 104 may be a private cloud, a public cloud, a hybrid cloud, and the like. In addition, a cloud platform 104 may include, without limitation, container orchestration or management systems or platforms such as, as an example and without limitation, a Kubernetes® deployment, and the like, as well as any combination thereof.

A cloud platform 104 may be implemented as a physical network of discrete, interconnected objects, and the like, a virtual network, providing for interconnection of various virtual systems and devices, as well as a hybrid physical-virtual network, including both physical and virtualized components. A cloud platform 104 may be, or may replicate or otherwise simulate or emulate, as examples, and without limitation, a local area network, a wide area network, the Internet, the World-Wide Web (WWW), and the like, as well as any combination thereof. Further, a cloud platform 104 may include one or more subnets, such as the subnets, 130, of FIG. 1B, below, wherein each subnet may be configured to serve as a cloud platform 104 for the various network objects which may be included in the subnet, while retaining the connectivity and functionalities provided by the cloud platform 104.

Network objects 105, as may be included in a cloud platform 104, are objects, systems, devices, components, applications, entities, and the like, configured to operate within the cloud platform 104 and provide various functionalities therein. Specifically, the network objects 105 may be objects configured to send, receive, or both send and receive, network data. The network objects 105 may be configured to connect with various other network objects 105, various external objects, and the like, as well as any combination thereof, for purposes including, without limitation, sending data, receiving data, monitoring data transmissions, monitoring network status and activity, and the like, as well as any combination thereof.

Examples of network objects 105, as may be relevant to the methods, processes, and descriptions provided herein include, without limitation, objects providing support for application-layer communications and systems, including application-layer communications and systems relevant to layer seven of the open systems interconnection (OSI)

model. Further examples of network objects 105, relevant to the methods, processes, and descriptions provided herein, include, without limitation, cloud-native constructs, such as private endpoints, transit gateways, tag-based rulesets and objects configured to apply such rules, Kubernetes Istio and Calico services and applications, and the like. In addition, examples of network objects 105 may include, without limitation, third-party containers and images, such as Nginx, web-access firewall (WAF), and firewall implementations, multi-object or cross-object connections, such as cross-cloud connections and Kubernetes-to-cloud connections, as well as container managers, such as Kubernetes, and connections therewith. It may also be understood that network objects 105 may include other objects similar to those described hereinabove, as well as any combination thereof. As another example, network objects may include virtual entities, devices, and the like, to process layer-7 (application layer) traffic, such as objects relevant to Amazon AWS® layer seven services and applications, Amazon Load Balancer® (ALB) layer seven services and applications, Kubernetes ingress, and the like.

The network objects 105 may be configured to include one or more communication ports, where the included communication ports provide for connection of various objects according to one or more protocols, and at different communication layers of the OSI model.

In an example configuration, the network objects 105 are virtual entities or instances of systems, devices, or components, including virtual systems, devices, or components, or any combination thereof. Examples of network objects 105 include, without limitation, virtual networks, firewalls, network interface cards, proxies, gateways, containers, container management objects, virtual machines, subnets 130, hubs, virtual private networks (VPNs), and the like, as well as any combination thereof.

The applications 106, as may be executed in one or more cloud platforms 104, are services, processes, and the like, configured to provide one or more functionalities by execution of various commands and instructions. The applications 106 may be part of a software project of an enterprise or organization. The applications 106 may interact or communicate with other applications, regardless of the platform 104 in which the applications 106 are deployed. It should be understood that a single application, including the same application, may be both present and executed in multiple cloud platforms 104, including multiple cloud platforms 104 of the same cloud environment 103, without loss of generality or departure from the scope of the disclosure.

The network 108 is a communication system providing for the connection of the cloud environment 103, and its various components and sub-parts, with a cyber-security system 150, as well as other, like, systems, devices, and components, and any combination thereof. The network 108 may be implemented as a physical network of discrete, systems, devices, components, objects, and the like, a virtual network, providing for interconnection of various virtual systems and devices, as well as a hybrid physical-virtual network, including both physical and virtualized components. The network 108 may be, as examples, and without limitation, a local area network, a wide area network, the Internet, the World-Wide Web (WWW), and the like, as well as any combination thereof.

The cyber-security system 150 is a system, device, or component, configured to provide one or more network analysis functionalities including, without limitation, network analysis, traffic analysis, object querying, graph generation, and the like, as well as any combination thereof. The cyber-security system 150 may be configured to execute one or more instructions, methods, processes, and the like, including, without limitation, the process described with respect to FIG. 2, other, like, processes, and any combination thereof.

The cyber-security system 150 may be configured as a physical system, device, or component, as a virtual system, device, or component, or in a hybrid physical-virtual configuration. A detailed description of a cyber-security system, 150, according to an embodiment, is provided with respect to FIG. 4, below. It may be understood that, while the cyber-security system 150 is depicted in FIG. 1A as a discrete element external to the cloud environment 103, the cyber-security system 150 may be included within any of the various elements of the network system 102, including the cloud environment 103, the various cloud platforms 104, and subparts thereof, and the network 108, without loss of generality or departure from the scope of the disclosure.

Figure 1B:
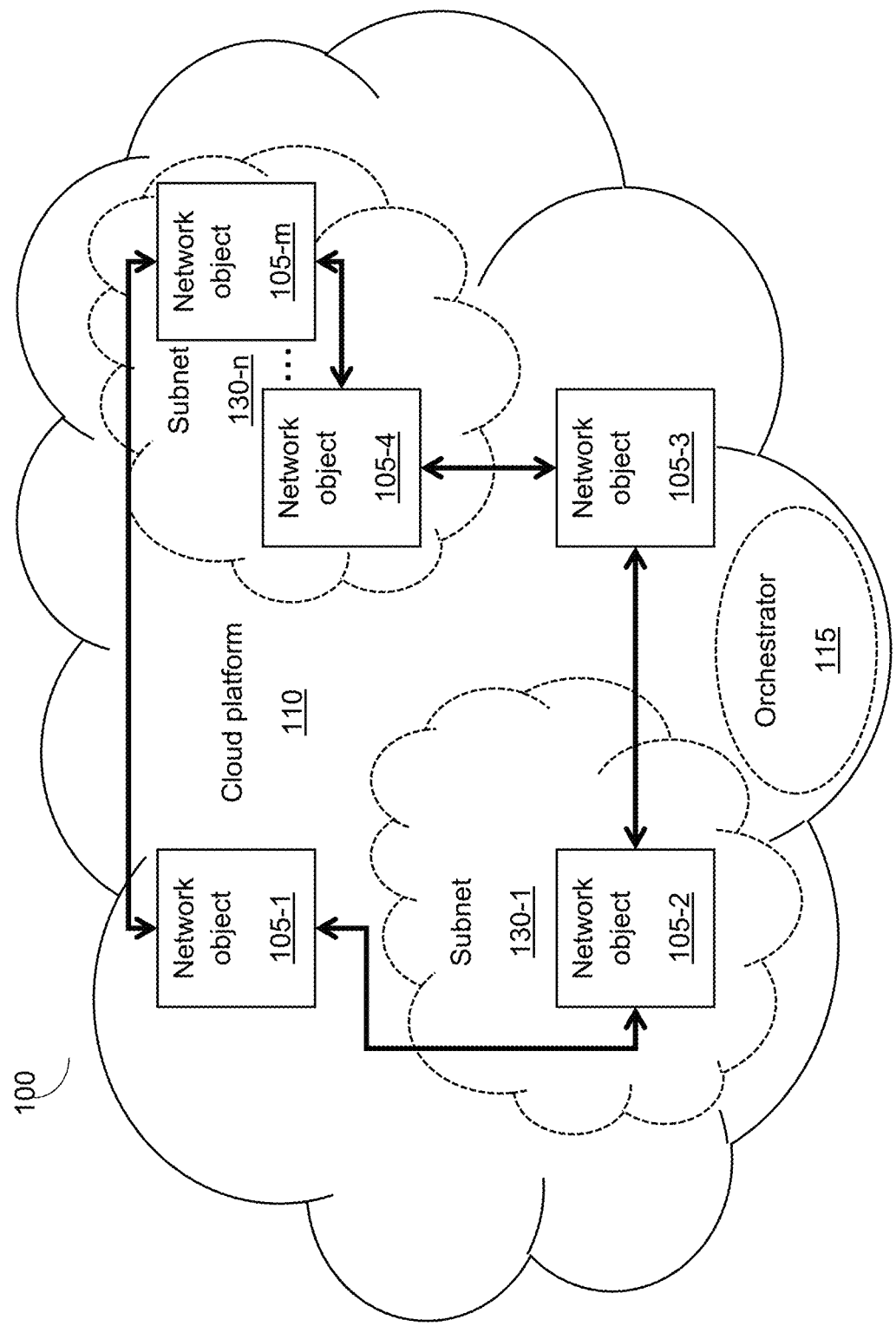
FIG. 1B is a network diagram depicting a network system and various associated network and external objects, according to an embodiment.

FIG. 1B is an example diagram depicting a network system 100 and various associated network and external objects, according to an embodiment. The depicted network system 100 includes a cloud platform 110, where the cloud platform 110 may be a cloud platform similar or identical to a cloud platform, 104, of FIG. 1A, above. The cloud platform 110 includes various subnets, 130-1 through 130-$n$ (hereinafter, "subnets" 130 or "subnet" 130), and various network objects, 105-1 through 105-$m$ (hereinafter, "network objects" 105 or "network object" 105). As applicable to the subnets 130, "n" is an integer having a value greater than or equal to two. Further, as applicable to the network objects 105, "m" is an integer having a value greater than or equal to five. In addition, while the network system 100 of FIG. 1B includes certain elements and combinations of elements, as well as connections therebetween, it may be understood that the depiction is provided for illustrative purposes, and that other, like, elements, combinations of elements, and connections therebetween may be implemented without loss of generality or departure from the scope of the disclosure. Other, like, network systems 100 may further include multiple cloud platforms 110, including variously-interconnected cloud platforms 110, and other, like, variations and configurations, without loss of generality or departure from the scope of the disclosure.

As described with respect to FIG. 1A, above, the cloud platform 110 is a platform, architecture, or other, like, configuration providing for connectivity of the various systems, devices, and components described with respect to FIG. 1B. The cloud platform 110 may be a commercially-available cloud system, provided on a service basis, such as, as examples and without limitation, Amazon AWS®, Microsoft Azure®, and the like. The cloud platform 110 may be a private cloud, a public cloud, a hybrid cloud, and the like. The cloud platform 110 may be implemented as a physical network of discrete, interconnected objects, and the like, a virtual network, providing for interconnection of various virtual systems and devices, as well as a hybrid physical-virtual network, including both physical and virtualized components.

The cloud platform 110 may be, or may replicate or otherwise simulate or emulate, as examples, and without limitation, a local area network, a wide area network, the Internet, the World-Wide Web (WWW), and the like, as well as any combination thereof. Further, as described with respect to FIG. 1A, above, the cloud platform 110 may include one or more subnets 130, wherein each subnet 130 may be configured to serve as a cloud platform 110 for the various network objects 105 included in the subnet 130, while retaining the connectivities and functionalities provided by the cloud platform 110.

The cloud platform 110 may be configured to include an orchestrator 115. The orchestrator 115 is configured to provide for management of the cloud platform 110. The orchestrator 115 may be configured to provide one or more functionalities including, without limitation, monitoring of elements or components of the cloud platform 110, logging and reporting data relating to the cloud platform 110, managing cloud platform 110 updates and maintenance, generating cloud platform 110 alerts, as well as other, like, functionalities, and any combination thereof. The orchestrator 115 may be configured to report one or more data features related to the cloud platform 110, such as may be requested during the execution of network analysis processes, such as those described hereinbelow.

The network objects 105 are network objects similar or identical to those network objects, 105, of FIG. 1A, above. As described with respect to FIG. 1A, the network objects 105 are virtual entities or instances of systems, devices, or components, including virtual systems, devices, or components, or any combination thereof. Examples of network objects 105 include, without limitation, virtual networks, firewalls, network interface cards, proxies, gateways, containers, container management objects, virtual machines, subnets 130, hubs, virtual private networks (VPNs), peering connections, load balancers, route tables, and the like, as well as any combination thereof.

External objects, as may be adjacent or relevant to a cloud platform 110, are objects similar or identical to the network objects 105. The external objects may be configured to communicate with one or more network objects 105, with other, various, external objects, and the like, as well as any combination thereof.

Figure 2:
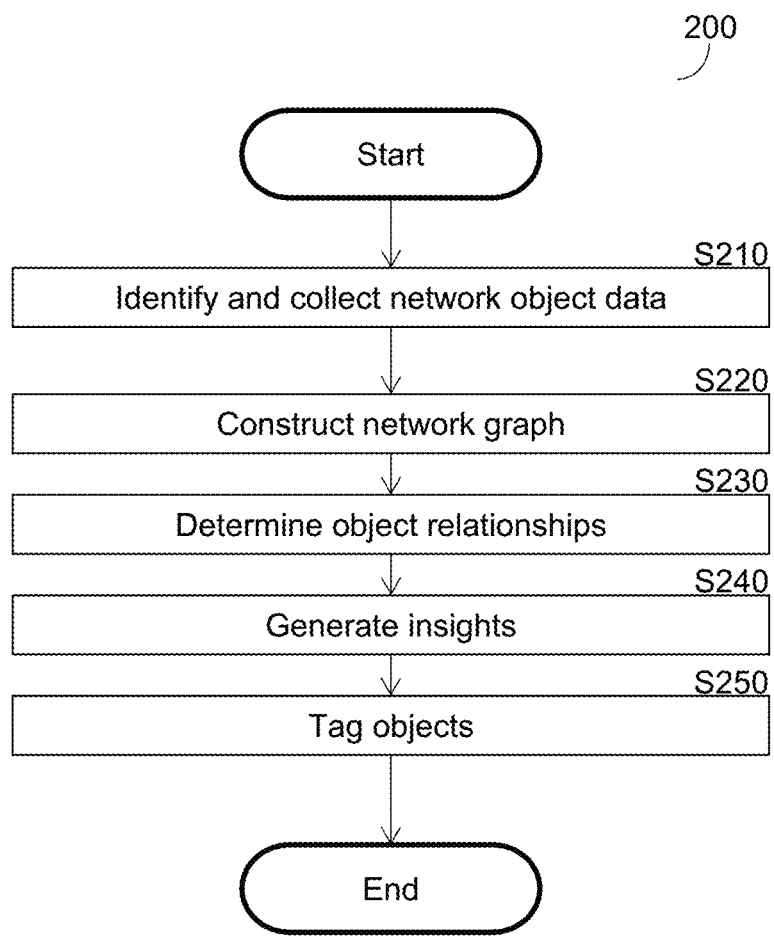
FIG. 2 is a flowchart depicting a method for constructing a network graph for a network system, according to an embodiment.

FIG. 2 is an example flowchart 200 depicting a method for constructing a network graph for a network system, according to an embodiment.

At S210, network objects are identified, and network object data is collected. In one embodiment, network objects may be identified by querying a cloud platform, through, for example, an orchestrator (e.g., orchestrator 115, of FIG. 1B, above), and the like. In an embodiment, S210 may include submitting one or more requests to each cloud platform and collecting responses therefrom. The requests may include instructions directing the orchestrator to report information including, without limitation, the number of devices connected to or included in the cloud platform, the names of such devices, the types of such devices, other, like, information, and any combination thereof.

In an embodiment, identification of network objects and collection of network object data at S210 includes querying each cloud platform, where such querying may include generation of one or more queries through an application programming interface (API), such as a REST API. Through the API, network objects' identities and description data are provided in response to such API queries. API queries may be pre-configured data requests, specified in the API, and configured to cause, for example, an orchestrator to return the one or more data features described herein. API queries may be generated based on one or more APIs, or the like, including generic APIs, such as REST, as well as platform-specific APIs, where such platform-specific APIs may be configured to provide for one or more predefined interactions with a cloud platform, such as Amazon AWS®, Microsoft Azure®, and the like, where such predefined interactions may include, without limitation, network object identification and data collection.

Further, at S210, network object data is collected. Network object data is data describing one or more network objects, such as those objects, 105, of FIG. 1B, above. Network object data may include data describing, as examples and without limitation, object types, object names or unique identifiers (IDs), object network addresses, object port configurations, object status, such as online, offline, busy, and available, object input signal configurations, object output signal configurations, object security or access configurations, object processing rules and the like, as well as any combination thereof. Object data may be collected at S210 from one or more sources including, without limitation, various networks, network monitors, subnets, external objects, network objects, and the like, such as the cloud platform, 110, cyber-security system, 150, subnets, 130, external objects, network objects, 105, cloud platform orchestrators, 115, all of FIG. 1B, above, and the like, as well as any combination thereof. Collection of network object data, at S210, may be executed via one or more means including, without limitation, generation and transmission of one or more API queries, such as are described hereinabove, by other, like, means, and any combination thereof.

As a first example, collection of network object data at S210 may include collection of the identities of all objects included in a cloud platform by generation and transmission of an API query. In a second example, where a specific object, such as a given firewall, is specified in an API query, collection of network object data at S210 may include collection of object data from a firewall, including the collection of firewall rules, collection of firewall event logs, collection of firewall port configurations, and the like, as well as any combination thereof. As a third example, collection of network object data at S210 may include collection of object data from all virtual machines (VMs) in a cloud platform, where such VMs are described generally in an API query, including the collection of data resources or libraries internal to the VMs, VM port configurations, VM statuses, and the like, as well as any combination thereof.

At S220, a network graph is constructed. A network graph is a data feature describing the various objects included in, and adjacent to, a network, as well as the relationships between such objects. A network graph may be constructed based on data including, without limitation, data relevant to the objects identified at S210, from which data is collected, and the like, as well as any combination thereof. A network graph may be constructed in one or more various formats including, without limitation, a table, chart, or other, non-visual, data organization format, a list of objects, other, like, formats, and any combination thereof, where such formats may provide network object information including, without limitation, descriptions of network objects, properties, relations, and the like, as well as any combination thereof. In an embodiment, construction of a network graph, at S220, may include construction of a visual "node and link" graph. An example network graph schema, generated in a visual format and presented through a network graph utility, is described with respect to FIG. 3A, below. An additional network graph data feature, including a list of network objects, where the list is configured to describe an object-to-object path, is described with respect to FIG. 3B, below.

At S230, relationships between network objects are determined. Network object relationships are descriptions of the various connections between the network objects identified at S210. Network relationships may describe aspects of the connections between objects including, without limitation, connected objects, relevant ports of connected objects, connection bandwidths, connection durations, connection protocols, connection names or IDs, connection statuses, and the like, as well as any combination thereof.

In an embodiment, network object relationships may be determined at S230 using a static analysis process. In this embodiment, the static analysis may include analysis of object and protocol code and rules, based on simulated network operation, as collected at S210, to provide for identification of network object relationships based on network object configurations. As an example of a static analytic determination, data collected from a firewall at S210 may specify, in the firewall's port configurations, communication with a first device on a first port using a first protocol and connection with a second device on a second port using a second protocol. Further, according to the same example, the firewall object may include one or more instructions specifying transmission of a specific log file, via a third port, to a connected repository. According to the same example, network object relationships determined at S230 may include connections between the firewall and the first device, connections between the firewall and the second device, and connections between the firewall and the repository.

Determination of network object relationships at S230 may further include updating the graph or graphs constructed at S220 to include the determined relationships. Graphs may be updated at S230 by associating one or more data labels, tags, or other, like, features with a graph entry for a network object determined to have a relationship with another object. The association of data labels and tags may further include the association of labels or tags describing various aspects of the determined relationship or connection including, as examples and without limitation, connection source and destination, connection type, connection direction, connection status, connection protocol, and the like, as well as any combination thereof. Accordingly, as an example, determination, at S230, of a relationship between two objects may include the association of a data label or tag with each object included in the relationship, the data label or tag describing the same relationship for each object. Further, in an embodiment, where a graph is presented as a visual representation of a network system, such as a "node-and-link" graph, updating of the graph, at S230, based on determined relationships, may further include updating the visual graph to include visible "links" or connections between object "nodes," such as by, as examples and without limitation, updating the original visible graph to include such links, adding a second, visible overlay to the graph, including the links, and the like, as well as any combination thereof.

In addition, determination of network object relationships at S230 may include analysis of such determined relationships to identify impermissible relationships. Where determination at S230 includes such permissibility analysis, such analysis may include, without limitation, comparison of determined relationships with one or more dictionaries, or other, like, repositories of object relationship information, to determine whether a given relationship matches a predefined relationship included in the dictionary, where such a pre-defined relationship may be pre-tagged as "permissible," "not permissible," or the like. Where a determined relationship is determined to match a relationship which has been pre-defined as "not permissible" or as otherwise unacceptable, the relationship may be removed from the graph, such as by updating the graph in a manner similar to that described with respect to adding relationships to the graph, with the update providing for removal of one or more specified unacceptable relationships.

Further, in an embodiment, network object relationships may be determined at S230 by application of observational or active logging methods, such as those methods providing for detection of object-to-object connections by monitoring traffic of a network in use.

At S240, network insights are generated. Network insights are natural-language representations of aspects of the network graph constructed at S220. Network insights may include pure-text descriptions of objects and relationships. An example of a pure-text object-relationship description, generated as an insight at S240, may be "firewall one is connected to object two, which is a VM, and object three, which is a load balancer." Such representations may be in a query format.

In addition, network insights may include detailed descriptions of objects, relationships, and the like, as well as any combination thereof. An example of a detailed object-relationship description, generated as an insight at S240, may be "the gateway is currently active, and is connected to the VM via the second port, using the first protocol."

As another example, including a multiple-step relationship, an insight may be generated at S240, the insight specifying a path from "virtual machine one to load balancer five, where port eighty is routed to port 1337 on virtual machine one, then from load balancer five to firewall two, where port eighty of firewall two is open, then from firewall two to subnet sixteen, where subnet sixteen has a network address of 10.0.1.0/24, then from subnet sixteen virtual network ten, where virtual network ten has a network address of 10.0.0.0/16, then from virtual network ten to virtual network eleven, via peering connection twelve, where peering connection twelve includes a routing rule to virtual network twelve, specifying virtual network twelve's network address, where virtual network twelve's network address is 172.31.0.0/16." The insight described with respect to the second example may be interpreted to describe a virtual machine accessible from a virtual network via a series of hops, where only specific ports and addresses are allowed and routed through the firewall.

Further, generation of network insights at S240 may include the generation of insights providing for network management or anomaly detection. Where generation of insights at S240 includes generation to provide for such functions, as well as other, similar functions, generation of insights may include, as examples and without limitation, generation of insights describing network configurations or events which are rare or novel, such as connection of a new device to a network, connections which are unauthorized, such as re-connection of a user's device to a subnet which the user is not permitted to access, connections which display anomalous behavior, such as connections displaying spikes of network activity, and the like. Such insights may be generated according to one or more pre-defined or user-defined filters, rules, and the like, as well as any combination thereof. As an example, generation of network insights at S240 may include generation of an insight specifying that "VM thirty normally connects to load balancer twenty and firewall eight but is currently only connected to load balancer twenty."

In addition, generation of network insights at S240 may include the generation of high-level insights, where high-level insights are insights similar to those described hereinabove and which are configured to include information describing one or more features of a network which may not be detectable based on the analysis of individual objects. Examples of high-level insights, as may be generated at S240, include, without limitation, "third-party networks A, B, and C currently have access to the internal network," "objects E, a database, and F, an administrator interface, are currently exposed to external networks," and "cross-environment exposure has been detected between the development and production environments."

At S250, network objects are tagged. Tagging of network objects at S250 may include, without limitation, association of one or more data labels, tags, or other, like, features, with graph entries for one or more network objects, including entries in graphs such as those described with respect to S220, above. The data labels, tags, or other, like, features, with graph entries, may include descriptions of aspects of relevant graphs, objects, relationships, and the like, as well as any combination thereof. Examples of relevant descriptions include, as examples and without limitation, insights, such as those generated at S240, object relationships, such as those determined at S230, object details, such as may be collected at S210, descriptions of whether an object appears in another graph, object type counts, per-object connection counts, graph connection counts, descriptions of an object's open ports and counts thereof, descriptions of an object's network address or addresses, descriptions of protocols relevant to an object, and other, like, descriptions, as well as any combination thereof.

In an embodiment, tagging of network objects at S250 may provide for enriched querying of graphs, such as through various network graph utilities, including a utility associated with the network graph schema described with respect to FIG. 3A, below, as well as other, like, presentations of network graph information, such as are described with respect to FIG. 3B, below, where such enriched querying may include the searching of one or more graphs for objects associated with one or more data labels or tags, including compound queries specifying multiple data labels or tags.

Figure 3A:
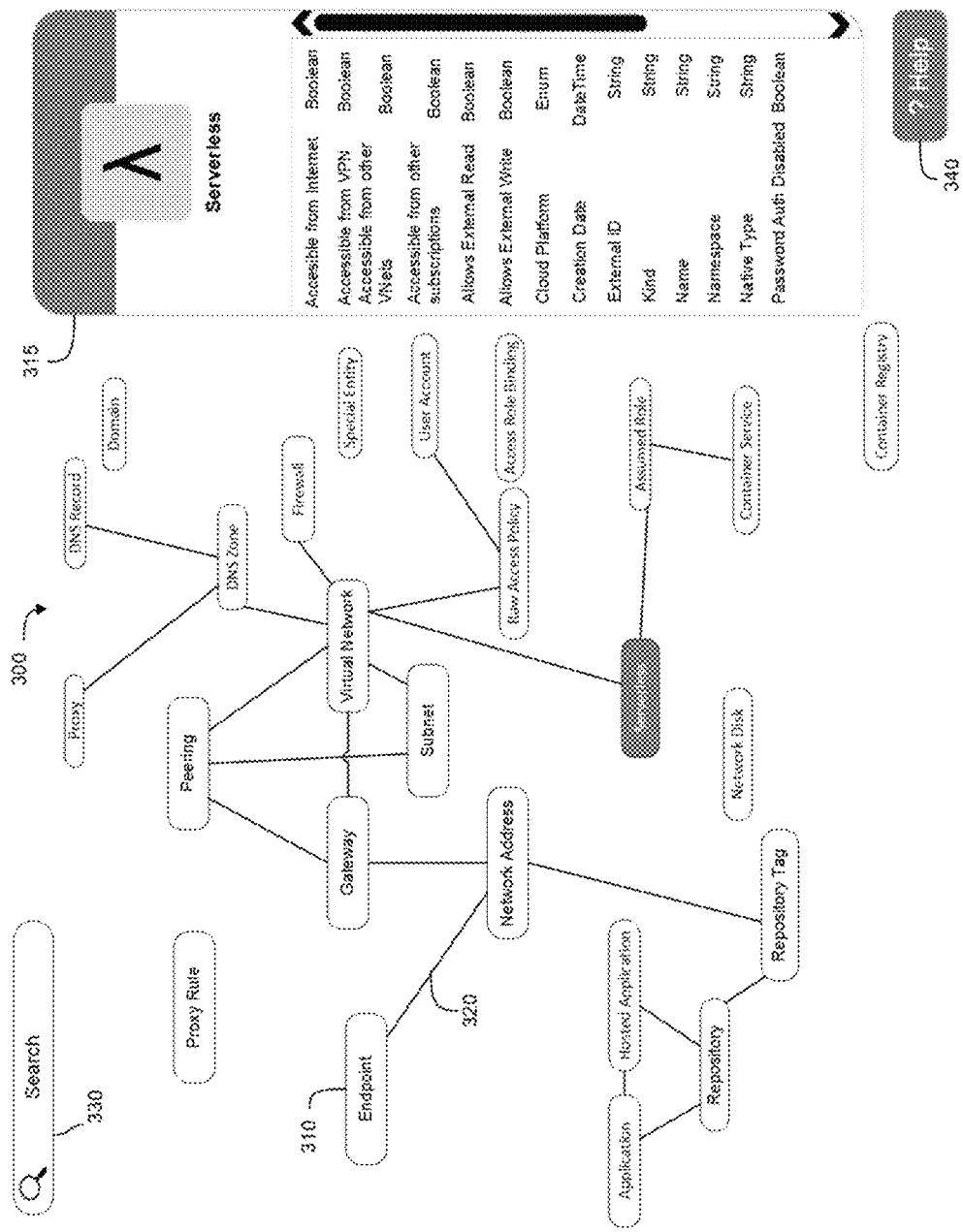
FIG. 3A is an example network graph schema, according to an embodiment.

FIG. 3A is an example screenshot of a network graph schema 300, generated according to an embodiment. The example network graph schema 300 is generated as a visual representation of a network, such as at S230 of FIG. 2, above, and is presented through a network graph utility. A network graph utility may be an application, interface, or other, like, means of providing a visual representation of a network graph schema 300, and the like, where the provided network graph schema 300 may include various interactive features, as described hereinbelow. A network graph utility may be configured as, as examples and without limitation, a web interface, an application or executable installed on a user or administrator device, other, like, configurations, and any combination thereof.

The network graph schema 300 of FIG. 3A is a network graph visualization representing a network, such as the networks described hereinabove, wherein the various objects, systems, devices, components, and the like, of the network are represented as nodes 310, wherein such nodes are variously interconnected by links 320, representing connections between the various objects, systems, devices, components, and the like. It may be understood that while only one node 310 and one link 320 are labeled for purposes of simplicity, other, like, nodes 310 and links 320 may be so labeled without loss of generality or departure from the scope of the disclosure.

The network graph schema 300, and corresponding network graph utility, may be configured to provide for various interactive functionalities. In an embodiment, where a user interacts with a node 310, such as by clicking the node 310 with a mouse or tapping the node 310 through a touchscreen, the graph utility may be configured to display a node overview pane 315. The node overview pane 315 may be an information panel, including data relating to the given node 310 and describing various object data features, such as those object data features collected at S210 of FIG. 2, above. The node overview pane 315 may be configured to provide information relating to the various nodes 310 including, as examples and without limitation, object names, types, statuses, relevant metadata, and the like, as well as any combination thereof.

Further, the network graph schema 300, and corresponding network graph utility, may be configured to include a search tool 330, providing for location and selection of one or more user-specified nodes 310 or links 320 within the graph. The search tool 330 may be configured to provide for search functionality based on one or more user specifications including, as examples and without limitation, object names, types, IDs, statuses, labels or tags associated with various elements of the network graph schema 300, and the like, as well as any combination thereof. In addition, the network graph schema 300, and corresponding network graph utility, may be configured to include a help tool 340, providing for display of one or more resources related to the network graph schema 300 and network graph utility.

It should be noted that a network graph schema 300, shown in FIG. 3A, may be constructed in other formats including, without limitation, a table, chart, or other, non-visual, data organization formats, a list of objects, other, like, formats, and any combination thereof.

Figure 3B:
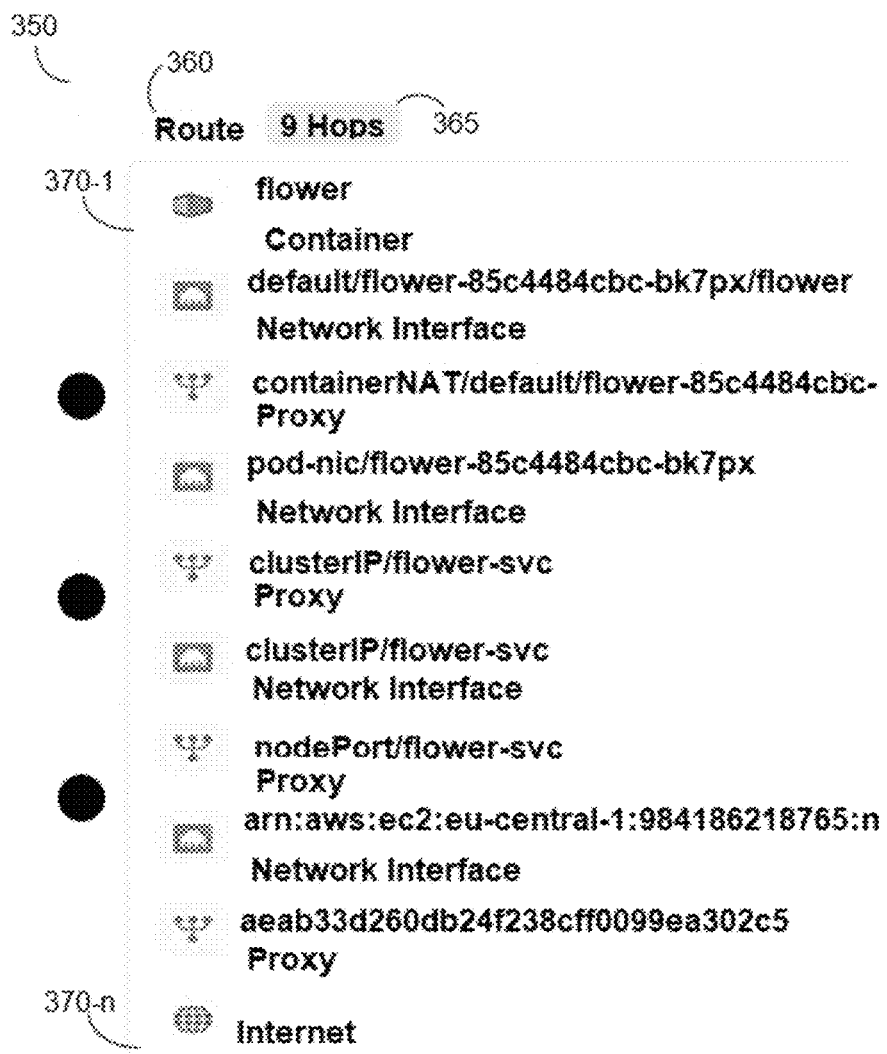
FIG. 3B is a network graph object list, configured to provide information describing object-to-object routing within a network graph, according to an embodiment.

FIG. 3B is an example network graph object list 350, configured to provide information describing object-to-object routing within a network graph, according to an embodiment. The network graph object list 350 includes a mode indicator 360, a mode-specific data display 365, and a list of objects, 370-1 through 370-$n$ (hereinafter, "object" 370 or "objects" 370), where 'n' is an integer having a value greater than or equal to two. It may be understood that, while the provided network graph object list is configured to provide a list of objects 370 arranged according to a defined mode, other, like, modes and object 370 arrangements may be similarly applicable without loss of generality or departure from the scope of the disclosure.

The network graph object list 350 is a list of objects within a network, a segment of a network, a path of a network, and the like, as well as any combination thereof. A network graph object list 350 may be generated or provided as a function of one or more methods including, without limitation, those methods described herein, other, like, methods, and any combination thereof. A network graph object list 350 may be, without limitation, a feature of a network graph management tool or utility, such as a tool or utility configured to provide the network graph schema of FIG. 3A, above, a stand-alone tool or utility, and the like, as well as any combination thereof. The network graph object list 350 may be configured to list network objects 370 in one or more orders based on factors including, without limitation, object names, object types, object connection latencies, mode-specific factors, other, like, factors, and any combination thereof. Where the network graph object list 350 is configured to list network objects 370 based on mode-specific factors, the mode indicator 360 may be configured to provide information describing a specific list mode, and the mode-specific data display 365 may be configured to provide information describing the contents of the list 350 in relation to one or more selected modes.

Modes are selected list-organization profiles, configured to provide for population of a network graph object list 350 in one or more configurations. Modes may provide for configuration of a network graph object list 350, including configurations specific to, as examples and without limitation, routing paths, object utilization or availability descriptions, other, like, configurations, and any combination thereof. Where a given mode is selected, the selected mode may be displayed via a mode indicator 360, where the mode indicator is configured to provide descriptive information regarding a selected mode. Further, where a mode is selected, the mode-specific data display 365 may be configured to display information regarding a specific network graph object list 350 populated based on the specified mode or modes.

As an example, with reference to the provided FIG. 3B, a "route" mode may be selected, providing for population of a network graph object list 350 with objects occupying a data path between a first object 370-1 and a destination object 370-n. According to the same example, the mode indicator 360 may be configured to display "Route," indicating that the network graph object list 350 is populated to provide information describing a route between the specified objects, and the mode-specific data display 365 may be configured to display "9 hops," indicating that a transmission from a first object 370-1 makes nine "hops," or transmissions between objects, before reaching the destination object 370-n. Further, according to the same example, the network graph object list 350 may be configured to include and display each network object 370 through which the transmission passes, including the first object 370-1 and the destination object 370-n, in the order of transmission.

Figure 4:
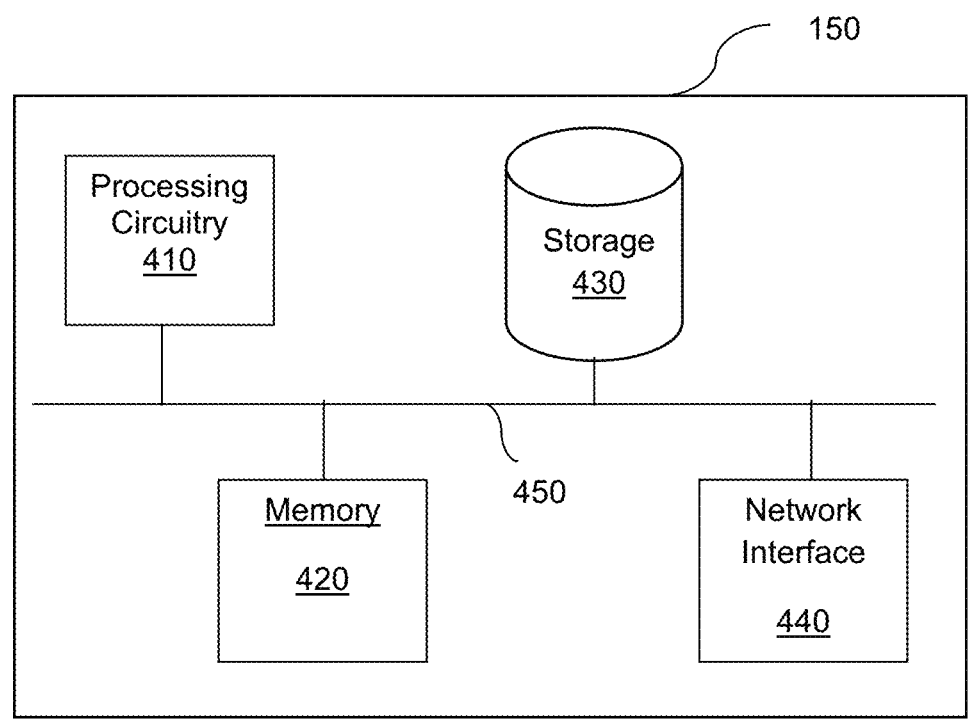
FIG. 4 is a hardware block diagram depicting a code compliance system, according to an embodiment.

FIG. 4 is an example hardware block diagram 400 depicting a cyber-security system 150, according to an embodiment. The cyber-security system 150 includes a processing circuitry 410 coupled to a memory 420, a storage 430, and a network interface 440. In an embodiment, the components of the cyber-security system 150 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 420 may be volatile (e.g., random access memory, etc.), non-volatile (e.g., read only memory, flash memory, etc.), or a combination thereof.

In one configuration, software for implementing one or more embodiments disclosed herein may be stored in the storage 430. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 430 may be magnetic storage, optical storage, and the like, and may be realized, for example, as flash memory or another memory technology, compact disk-read only memory (CD-ROM), Digital Versatile Disks (DVDs), or any other medium which can be used to store the desired information.

The network interface 440 allows the cyber-security system 150 to communicate with the various components, devices, and systems described herein for network analysis, as well as other, like, purposes.

It should be understood that the embodiments described herein are not limited to the specific architecture illustrated in FIG. 4, and other architectures may be equally used without departing from the scope of the disclosed embodiments.

It should be noted that the computer-readable instructions may be construed broadly to mean any type of instructions, whether referred to as software, firmware, middleware, microcode, hardware description language, or otherwise. Instructions may include code, such as in source code format, binary code format, executable code format, or any other suitable format of code. The instructions, when executed by the circuitry, cause the circuitry to perform the various processes described herein.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units (CPUs), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform, such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for determining exposure of vulnerable network objects having cyber-threats, comprising:
    collecting network object data on a plurality of network objects deployed in a cloud computing environment;
    constructing a network graph based on the collected network object data, wherein the network graph includes a visual representation of network objects identified in the cloud computing environment;
    determining relationships between the identified network objects in the network graph, wherein the determined relationships between the identified network objects includes descriptions of connections between the identified network objects;
    analyzing the network graph and the determined relationships to generate insights, wherein the generated insights include at least a route between an identified network object and an external network; and
    tagging network objects in the network graph for which the insight is generated.

2. The method of claim 1, further comprising:
    determining a number of transmissions based on a route between a first identified network object and the external network; and
    generating a visual indication of the number of transmissions.

3. The method of claim 2, further comprising:
    determining an order of transmission between the identified network objects; and
    populating the network graph with a data path based on the determined order of transmission and the determined route.

4. The method of claim 1, further comprising:
    generating a list including each network object in the route between an identified network object and the external network.

5. The method of claim 4, further comprising:
    determining an order of transmission between the identified network objects; and
    generating the list further based on the determined order of transmission.

6. The method of claim 5, further comprising:
    generating a visual representation of the generated list.

7. The method of claim 1, further comprising:
    populating the network graph with a data path between the identified network object and a destination network object, wherein the identified network object is exposed to the external network.

8. The method of claim 7, further comprising:
    determining an order of transmission between the identified network object and the destination network object; and
    populating the network graph with the data path further based on the determined order of transmission.

9. The method of claim 1, further comprising:
    generating an alert based on the generated insights.

10. A non-transitory computer-readable medium storing a set of instructions for determining exposure of vulnerable network objects having cyber-threats, the set of instructions comprising:
    one or more instructions that, when executed by one or more processors of a device, cause the device to:
        collect network object data on a plurality of network objects deployed in a cloud computing environment;
        construct a network graph based on the collected network object data, wherein the network graph includes a visual representation of network objects identified in the cloud computing environment;
        determine relationships between the identified network objects in the network graph, wherein the determined relationships between the identified network objects includes descriptions of connections between the identified network objects;
        analyze the network graph and the determined relationships to generate insights, wherein the generated insights include at least a route between an identified network object and an external network; and
        tag network objects in the network graph for which the insight is generated.

11. A system for determining exposure of vulnerable network objects having cyber-threats comprising:
    a processing circuitry;
    a memory, the memory containing instructions that, when executed by the processing circuitry, configure the system to:
        collect network object data on a plurality of network objects deployed in a cloud computing environment;
        construct a network graph based on the collected network object data, wherein the network graph includes a visual representation of network objects identified in the cloud computing environment;
        determine relationships between the identified network objects in the network graph, wherein the determined relationships between the identified network objects includes descriptions of connections between the identified network objects;
        analyze the network graph and the determined relationships to generate insights, wherein the generated insights include at least a route between an identified network object and an external network; and
        tag network objects in the network graph for which the insight is generated.

12. The system of claim 11, wherein the memory contains further instructions which when executed by the processing circuitry further configure the system to:
    determine a number of transmissions based on a route between a first identified network object and the external network; and
    generate a visual indication of the number of transmissions.

13. The system of claim 12, wherein the memory contains further instructions which when executed by the processing circuitry further configure the system to:
    determine an order of transmission between the identified network objects; and
    populate the network graph with a data path based on the determined order of transmission and the determined route.

14. The system of claim 11, wherein the memory contains further instructions which when executed by the processing circuitry further configure the system to:
    generate a list including each network object in the route between an identified network object and the external network.

15. The system of claim 14, wherein the memory contains further instructions which when executed by the processing circuitry further configure the system to:
    determine an order of transmission between the identified network objects; and
    generate the list further based on the determined order of transmission.

16. The system of claim 15, wherein the memory contains further instructions which when executed by the processing circuitry further configure the system to:
generate a visual representation of the generated list.

17. The system of claim 11, wherein the memory contains further instructions which when executed by the processing circuitry further configure the system to:
populate the network graph with a data path between the identified network object and a destination network object, wherein the identified network object is exposed to the external network.

18. The system of claim 17, wherein the memory contains further instructions which when executed by the processing circuitry further configure the system to:
determine an order of transmission between the identified network object and the destination network object; and
populate the network graph with the data path further based on the determined order of transmission.

19. The system of claim 11, wherein the memory contains further instructions which when executed by the processing circuitry further configure the system to:
generate an alert based on the generated insights.

\* \* \* \* \*